(12) United States Patent
Zhang et al.

(10) Patent No.: US 8,774,958 B2
(45) Date of Patent: Jul. 8, 2014

(54) SELECTION OF POLISHING PARAMETERS TO GENERATE REMOVAL PROFILE

(75) Inventors: Huanbo Zhang, San Jose, CA (US); Garrett Ho Yee Sin, Sunnyvale, CA (US); King Yi Heung, Santa Clara, CA (US); Nathan Bohannon, Saratoga, CA (US); Qing Zhang, North Wales, PA (US)

(73) Assignee: Applied Materials, Inc., Santa Clara, CA (US)

( * ) Notice: Subject to any disclaimer, the term of this patent is extended or adjusted under 35 U.S.C. 154(b) by 473 days.

(21) Appl. No.: 13/098,257

(22) Filed: Apr. 29, 2011

(65) Prior Publication Data

US 2012/0277897 A1 Nov. 1, 2012

(51) Int. Cl.
*G06F 19/00* (2011.01)
*B24B 49/00* (2012.01)

(52) U.S. Cl.
USPC ............................................. 700/164; 451/5

(58) Field of Classification Search
USPC ........................................................ 700/164
See application file for complete search history.

(56) References Cited

U.S. PATENT DOCUMENTS

| | | | |
|---|---|---|---|
| 6,439,964 B1 * | 8/2002 | Prahbu et al. ...................... | 451/8 |
| 6,540,591 B1 * | 4/2003 | Pasadyn et al. .................. | 451/41 |
| 6,932,671 B1 * | 8/2005 | Korovin et al. .................... | 451/5 |
| 7,115,017 B1 | 10/2006 | Laursen et al. | |
| 2002/0193899 A1 | 12/2002 | Shanmugasundram et al. | |
| 2004/0023606 A1 | 2/2004 | Wang et al. | |
| 2005/0070205 A1 | 3/2005 | Korovin et al. | |
| 2007/0102116 A1 | 5/2007 | Shanmugasundram et al. | |
| 2008/0119119 A1 | 5/2008 | Zuniga et al. | |

OTHER PUBLICATIONS

International Search Report/Written Opinion dated Nov. 28, 2012 for corresponding application PCT/US2012/034702.
Jaehyun Bae et al., "Effect of Retainer Pressure on Removal Profile and Stress Distribution in Oxide CMP", Nov. 19-21, 2009, International Conference on Planarization/CMP Technology, Fukuoka.

* cited by examiner

*Primary Examiner* — Sean Shechtman
*Assistant Examiner* — Steven Garland
(74) *Attorney, Agent, or Firm* — Fish & Richardson P.C.

(57) ABSTRACT

Values are selected for a plurality of controllable parameters of a chemical mechanical polishing system that includes a carrier head with a plurality of zones to apply independently controllable pressures on a substrate. Data is stored relating variation in removal profile on a front surface of the substrate to variation in the controllable parameters, the data including removal at a plurality of positions on the front surface of the substrate, there being a greater number of positions than chambers. A value is determined for each parameter of the plurality of controllable parameters to minimize a difference between a target removal profile and an expected removal profile calculated from the data relating variation in removal profile on a front surface of the substrate to variation in the parameters. The value for each parameter of the plurality of controllable parameters is stored.

21 Claims, 4 Drawing Sheets

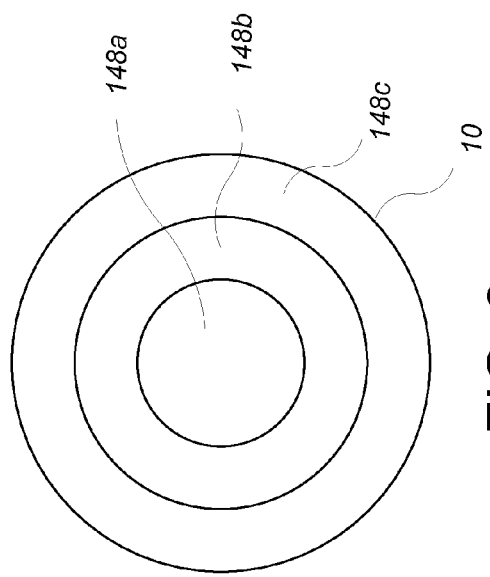
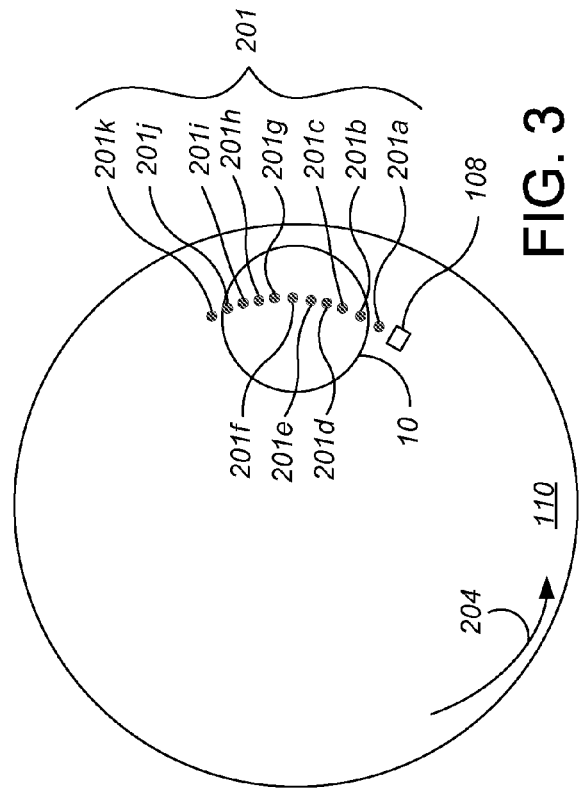

SELECTION OF POLISHING PARAMETERS TO GENERATE REMOVAL PROFILE

TECHNICAL FIELD

The present disclosure relates to control of a carrier head during chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

A problem in CMP is achieving a uniform thickness of the substrate layer. Variations in the slurry distribution, the polishing pad condition, the relative speed between the polishing pad and the substrate, and the dynamics of the interaction of the polishing pad and the substrate, can cause variations in the material removal rate across the substrate. These variations, as well as variations in the initial thickness of the substrate layer, cause variations in resulting thickness of the substrate layer.

Some carrier heads include multiple independently pressurizable chambers. The chambers can provide independently controllable pressures on different portions of the substrate. By providing different pressures to the different chambers, the pressure on corresponding portions of the substrate, and thus the polishing rate on those corresponding portions, can be selected to partially compensate for non-uniformity in the substrate layer.

SUMMARY

Some control systems adjust the pressure in the chambers of a carrier head to achieve a target polishing rate profile under an assumption that a uniform pressure is applied across the region of the substrate covered by the chamber. For example, the target polishing rate profile may include only a single target value per chamber, or an algorithm that that calculates a set of pressures for the chambers can compare the same value for a given chamber to the target value for each point on the wafer below the given chamber.

However, in actual operation, the pressure applied by a chamber can be non-uniform across the region of the substrate covered by the chamber. In addition, the pressure in one chamber can influence the pressure on regions of the substrate that are not directly under the chamber, e.g., the pressure in one chamber can "spill over" to regions covered by other chambers. A controller that calculates the pressures for the chambers can account for this spill-over and non-uniformity. For example, a removal profile that is actually generated by a chamber can be measured, and this removal profile can be used when calculating the set of pressures for the chambers. More generally, removal profiles can be generated for process parameters at different values, and these removal profiles can be used when calculating values for the process parameters to achieve a target profile.

In one aspect, there is a method of selecting values for a plurality of controllable parameters of a chemical mechanical polishing system that includes a carrier head with a plurality of zones to apply independently controllable pressures on a substrate. Data is stored relating variation in removal profile on a front surface of the substrate to variation in the controllable parameters, the data including removal at a plurality of positions on the front surface of the substrate, there being a greater number of positions than chambers. A value is determined for each parameter of the plurality of controllable parameters to minimize a difference between a target removal profile and an expected removal profile calculated from the data relating variation in removal profile on a front surface of the substrate to variation in the parameters. The value for each parameter of the plurality of controllable parameters is stored.

Implementations may optionally include one or more of the following features. The plurality of controllable parameters may include pressures for a plurality of chambers in the carrier head that apply pressure to the plurality of zones. The plurality of controllable parameters may include a pressure for a chamber in the carrier head that applies pressure to a retaining ring of the carrier head. The plurality of zones may be arranged concentrically and the plurality of positions may be radial distances from the center of the substrate. The plurality of positions may include a first plurality of positions below a first zone of the plurality of zones and a second plurality of positions below a second zone of the plurality of zones. The plurality of controllable parameters may include a platen rotation rate or a carrier head rotation rate. The positions may be regularly spaced across the substrate. There may be a greater number of positions than parameters. Storing data may include storing a plurality of measured removal profiles, and each measured removal profile may include an amount removed from a front surface of a substrate at each of a plurality of positions on the substrate. The plurality of removal profiles may include a baseline removal profile for one substrate polished under a set of baseline values for the plurality of controllable parameters. The plurality of removal profiles may include a plurality of adjusted removal profiles for additional substrates, and each additional substrate may be polished with exactly one of the plurality of controllable parameters set to an adjusted value that is different from the baseline value for the one substrate. The one of the plurality of controllable parameters may be different for each additional substrate. Calculating the expected removal profile may include calculating $$ERP = BRP + [K][P']*BRP$$

where ERP is the expected removal profile, BRP is the baseline removal profile, [K] is a matrix of constants having a number of columns equal to the total number of parameters, N, and a number of rows equal to the total number of radial positions on the substrate surface where the profile is measured, M, and [P'] is a column matrix of adjusted polishing system parameters. The adjusted polishing system parameters may be $$P'_i = \frac{P_i - P0_i}{P0_i}$$

where $P_i$ is the value of the polishing parameter to be calculated, and $P0_i$ is the baseline value for the polishing parameter. The matrix [K] may be expressed as $$[K] = \begin{bmatrix} K_{1,1} & \cdots & K_{1,N} \\ \vdots & \ddots & \vdots \\ K_{M,1} & \cdots & K_{M,N} \end{bmatrix}$$

where M is the total number of radial substrate positions x at which profile measurements are taken and N is the total number of parameters. Constants of the matrix may be $$K_{x,i} = \frac{ARP_{x,i} - BRP_x}{BRP_x * \left[\frac{PA_i - P0_i}{P0_i}\right]}$$

where $K_{x,i}$ is the value of the matrix [K] corresponding to the substrate profile position x for the $i^{th}$ parameter, $ARP_{x,i}$ is the amount of material removed at radial position x for the $i^{th}$ adjusted parameter, $BRP_x$ is the amount of material removed at radial position x according to the previously calculated baseline removal profile, $PA_i$ is the $i^{th}$ parameter value used to generate the $i^{th}$ adjusted removal profile, and $P0_i$ is the $i^{th}$ parameter value for the baseline removal profile. Determining a value for each parameter may include iteratively adjusting at least one value, calculating the expected removal profile from the data, and determining a difference between the expect pressure profile and the target pressure profile. Determining the value for the chamber pressure for each chamber may include Newton's method of optimization. The target removal profile may be generated from data collected in-situ during polishing of a first substrate, and adjusting at least one pressure applied during the polishing of the first substrate to match the value for the chamber pressure. The target removal profile may be generated from data collected in-situ during polishing of a first substrate at a first platen, and polishing the first substrate at a different second platen using the chamber pressure. The target removal profile may be generated from data collected in-situ during polishing of a first substrate at a first platen, and polishing a different second substrate at the first platen using the chamber pressure.

The details of one or more implementations are set forth in the accompanying drawings and the description below. Other aspects, features, and advantages will be apparent from the description and drawings, and from the claims.

BRIEF DESCRIPTION OF THE DRAWINGS

FIG. 2 shows a schematic top view of a substrate having multiple zones.

FIG. 3 shows a top view of a polishing pad and shows locations where in-situ measurements can be taken on a substrate.

Like reference numbers and designations in the various drawings indicate like elements.

DETAILED DESCRIPTION

A polishing system can have multiple controllable parameters that influence the polishing rate on of substrate. Each parameter controls the operation of an associated hardware component of the polishing system, and the parameter can be set by software, e.g., in a control system. Examples of controllable parameters include pressure in chambers in a carrier head (including pressure in chambers that apply downward pressure to the substrate or to a retaining ring), carrier head rotation rate, and platen rotation rate.

Figure 1:
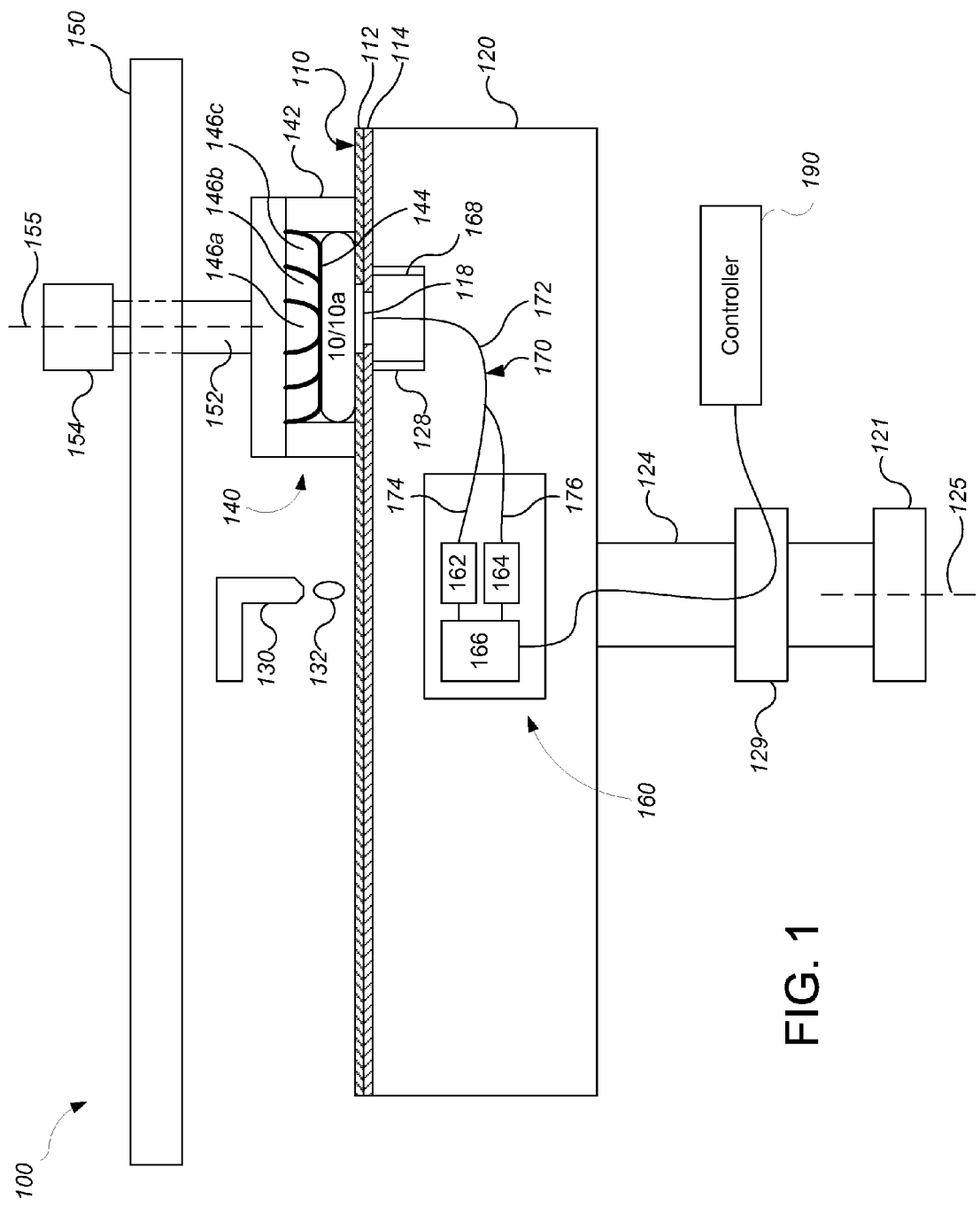
FIG. 1 shows a schematic cross-sectional view of an example chemical mechanical polishing apparatus.

FIG. 1 illustrates an example of a polishing apparatus 100. The polishing apparatus 100 includes a rotatable disk-shaped platen 120 on which a polishing pad 110 is situated. The platen is operable to rotate about an axis 125. For example, a motor 121 can turn a drive shaft 124 to rotate the platen 120. The polishing pad 110 can be detachably secured to the platen 120, for example, by a layer of adhesive. The polishing pad 110 can be a two-layer polishing pad with an outer polishing layer 112 and a softer backing layer 114.

The polishing apparatus 100 can include a combined slurry/rinse arm 130. During polishing, the arm 130 is operable to dispense a polishing liquid 132, such as a slurry, onto the polishing pad 110. While only one slurry/rinse arm 130 is shown, additional nozzles, such as one or more dedicated slurry arms per carrier head, can be used. The polishing apparatus can also include a polishing pad conditioner to abrade the polishing pad 110 to maintain the polishing pad 110 in a consistent abrasive state.

The polishing apparatus 100 can further include a carrier heads 140. The carrier head 140 may be operable to hold a substrate 10 against the polishing pad 110. While only one carrier head 140 is shown, additional carrier heads can be used and may be preferable is some implementations. In such embodiments, each carrier head 140 can be controlled independently, with the polishing parameters associated with the carrier head (e.g., chamber pressure, retaining ring pressure, and/or carrier head rotation rate), independently set.

Carrier head 140 can include a retaining ring 142 to retain the substrate 10 below a flexible membrane 144. Carrier head 140 may also include a plurality of independently controllable pressurizable chambers defined by the membrane, e.g., 3 chambers 146a-146c, which can apply independently controlled amounts of pressure to associated zones 148a-148c on the flexible membrane 144, and thus on the back side of the substrate 10 (see FIG. 2). The flexible membrane 144 can be formed of an elastic material, such as a high strength silicone rubber. Referring to FIG. 2, the center zone 148a can be substantially circular, and the remaining zones 148b-148e can be concentric annular zones around the center zone 148a. Although only three chambers are illustrated in FIGS. 1 and 2 for ease of illustration, there could be two chambers, or four or more chambers, e.g., five chambers.

Returning to FIG. 1, carrier head 140 is suspended from a support structure 150, e.g., a carousel, and is connected by a drive shaft 152 to a carrier head rotation motor 154 so that the carrier head can rotate about an axis 155. Optionally, carrier head 140 can oscillate laterally, e.g., on sliders on the carousel 150, or by rotational oscillation of the carousel itself. In operation, the platen is rotated about its central axis 125, and the carrier head is rotated about its central axis 155 and translated laterally across the top surface of the polishing pad.

Again, while only one carrier head 140 is shown, more carrier heads can be provided to hold additional substrates so that the surface area of polishing pad 110 may be used efficiently. Thus, the number of carrier head assemblies adapted to hold substrates for a simultaneous polishing process can be based, at least in part, on the surface area of the polishing pad 110.

The polishing apparatus also includes an in-situ monitoring system 160, the data from which can be used by a controller 190 to determine whether to adjust a polishing rate or an adjustment for the polishing rate as discussed below. The in-situ monitoring system 160 can include an optical monitoring system, e.g., a spectrographic monitoring system, or an eddy current monitoring system.

In one embodiment, the monitoring system 160 is an optical monitoring system. An optical access through the polishing pad is provided by including an aperture (i.e., a hole that runs through the pad) or a solid window 118. The solid window 118 can be secured to the polishing pad 110, e.g., as a plug that fills an aperture in the polishing pad, e.g., is molded to or adhesively secured to the polishing pad, although in some implementations the solid window can be supported on the platen 120 and project into an aperture in the polishing pad.

The optical monitoring system 160 can include a light source 162, a light detector 164, and circuitry 166 for sending and receiving signals between a remote controller 190, e.g., a computer, and the light source 162 and light detector 164. One or more optical fibers can be used to transmit the light from the light source 162 to the optical access in the polishing pad, and to transmit light reflected from the substrate 10 to the detector 164. For example, a bifurcated optical fiber 170 can be used to transmit the light from the light source 162 to the substrate 10 and back to the detector 164. The bifurcated optical fiber an include a trunk 172 positioned in proximity to the optical access, and two branches 174 and 176 connected to the light source 162 and detector 164, respectively.

In some implementations, the top surface of the platen can include a recess 128 into which is fit an optical head 168 that holds one end of the trunk 172 of the bifurcated fiber. The optical head 168 can include a mechanism to adjust the vertical distance between the top of the trunk 172 and the solid window 118.

The output of the circuitry 166 can be a digital electronic signal that passes through a rotary coupler 129, e.g., a slip ring, in the drive shaft 124 to the controller 190 for the optical monitoring system. Similarly, the light source can be turned on or off in response to control commands in digital electronic signals that pass from the controller 190 through the rotary coupler 129 to the optical monitoring system 160. Alternatively, the circuitry 166 could communicate with the controller 190 by a wireless signal.

The light source 162 can be operable to emit white light. In one implementation, the white light emitted includes light having wavelengths of 200-800 nanometers. A suitable light source is a xenon lamp or a xenon mercury lamp.

The light detector 164 can be a spectrometer. A spectrometer is an optical instrument for measuring intensity of light over a portion of the electromagnetic spectrum. A suitable spectrometer is a grating spectrometer. Typical output for a spectrometer is the intensity of the light as a function of wavelength (or frequency).

As noted above, the light source 162 and light detector 164 can be connected to a computing device, e.g., the controller 190, operable to control their operation and receive their signals. The computing device can include a microprocessor situated near the polishing apparatus, e.g., a programmable computer. With respect to control, the computing device can, for example, synchronize activation of the light source with the rotation of the platen 120. The controller 190 can also generate a target pressure profile based on the data from the optical monitoring system 160, store the target pressure profile, and calculate a set of pressures for the chambers in the carrier head to achieve the target pressure profile.

In some implementations, the light source 162 and detector 164 of the in-situ monitoring system 160 are installed in and rotate with the platen 120. In this case, the motion of the platen will cause the sensor to scan across each substrate. In particular, as the platen 120 rotates, the controller 190 can cause the light source 162 to emit a series of flashes starting just before and ending just after each substrate 10 passes over the optical access. Alternatively, the computing device can cause the light source 162 to emit light continuously starting just before and ending just after each substrate 10 passes over the optical access. In either case, the signal from the detector can be integrated over a sampling period to generate spectra measurements at a sampling frequency.

In operation, the controller 190 can receive, for example, a signal that carries information describing a spectrum of the light received by the light detector for a particular flash of the light source or time frame of the detector. Thus, this spectrum is a spectrum measured in-situ during polishing.

As shown by in FIG. 3, if the detector is installed in the platen, due to the rotation of the platen (shown by arrow 204), as the window 108 travels below one carrier head (e.g., the carrier head holding the first substrate 10a), the optical monitoring system making spectra measurements at a sampling frequency will cause the spectra measurements to be taken at locations 201 in an arc that traverses the first substrate 10a. For example, each of points 201a-201k represents a location of a spectrum measurement by the monitoring system of the first substrate 10a (the number of points is illustrative; more or fewer measurements can be taken than illustrated, depending on the sampling frequency). As shown, over one rotation of the platen, spectra are obtained from different radii on the substrate 10a. That is, some spectra are obtained from locations closer to the center of the substrate 10a and some are closer to the edge.

Figure 4:
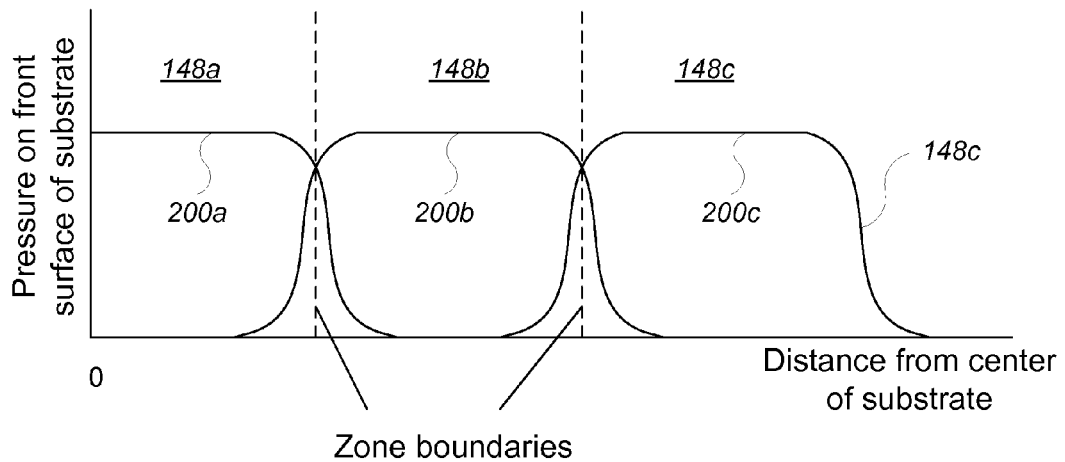
FIG. 4 shows an aggregation of measured pressure distributions resulting from pressurizing respective carrier head chambers one at a time.

As mentioned above with reference to FIG. 1, pressurization of the chambers 146a-146c controls the downward pressure of the substrate 10 against the polishing pad 110. In general, the majority of the pressure applied by a chamber to an associated zone of the membrane is imparted on a corresponding zone of the front surface of the substrate against the polishing pad. Some amount of the applied pressure, however, can "spill over" between zones on the front surface of the substrate (see FIG. 4). In addition, the pressure applied by the chamber within the associated zone may not be completely uniform. FIG. 4 illustrates several pressure distribution curves, each of which is an illustrative graph of the pressure applied at the front surface of the substrate as a function of the distance from the center of the substrate, assuming that a particular chamber in the carrier head is pressurized. Referring to FIG. 4, in this example, as shown by pressure distribution curve 200a, at least some pressure provided by chamber 146a is applied to both zones 148a and 148b of substrate 10. Likewise, as shown by pressure distribution curve 200b, at least some pressure provided by chamber 146b is applied to each of zones 148a-148c, and as shown by pressure distribution curve 200c, at least some pressure provided by chamber 146c is applied to zones 148c and 148b. In addition, even within zone 148a of substrate 10, the pressure applied by chamber 146a is not completely uniform.

Without being limited to any particular theory, the pressure spill over and non-uniformity may be a result of the flexible nature of membrane 144. That is, under pressure, portions of membrane 144 may be stretched or forced to expand beyond the originally defined zones. Further, and again without being limited to any particular theory, the pressure spill over may be caused by the thickness of the substrate 10. For example, the substrate 10 may be sufficiently thick such that pressure applied to the back surface (i.e., the substrate surface contacting the membrane 144) spreads out radially across the zone boundaries as it propagates to the front surface (i.e., the substrate surface contacting the polishing pad).

In general, a polishing system is controlled so that the post-polished substrate has a target surface profile, e.g., a target thickness across the substrate surface. The target surface profile may be uniform (e.g., planar) or non-uniform across the substrate surface. The target surface profile can be set manually by a manufacturer of the polishing system, set manually by an operator of the polishing system, e.g., an employee of the semiconductor fab, or could be generated automatically by computer software based on measurements of the performance of other tools at the semiconductor fab, e.g., to compensate for non-uniform deposition or removal by the other tools.

As noted above, the polishing rate (i.e., the rate at which material is removed from the substrate 10) can vary according to several polishing system parameters, e.g., chamber pressure retaining ring pressure, carrier head rotation rate, platen rotation rate, etc. As such, the combination of such parameters can determine the surface profile of the substrate 10 after polishing.

The controller 190 can be configured to store a target removal profile. The controller 190 uses the target removal profile to set the process parameters for the polishing system 20, e.g., the pressures in the chambers 146a-146c of the carrier head 140. The target removal profile represents a desired amount of material to be removed across the front surface of the substrate. In some implementations, the target removal profile can be determined, e.g., by the controller 190 or another computer system which forwards the target removal profile to the controller 190, based on an initial surface profile of the substrate 10 (e.g., as measured at a metrology station prior to polishing or by an in-situ monitoring system). For example, the target removal profile can be calculated as $$TRP = ISP - TSP \quad (1)$$

where TRP is the target removal profile, ISP is the initial surface profile, and TSP is the target surface profile. Alternatively, if the initial surface profile is unknown, then the initial surface profile can be set to a default value. Also, in some situations, the operator of the polishing system may desire to remove a target amount from the substrate rather than achieve a target profile. In addition, in some situations, the operator of the polishing system may simply set the target removal profile, e.g., based on a priori principals or previous experience. In this last case, the user can generate the target removal profile by user input, e.g., to the controller 190 or to another computer system which forwards the target removal profile to the controller 190.

The controller 190 can generate and store an expected removal profile (that is, the amount of material expected to be removed across the front surface of substrate 10) for a given set of values for the process parameters.

In general, it is advantageous to select values for the process parameters, e.g., the pressures in the chambers of the carrier head, so that the expected removal profile closely approximates (including exactly matches) the target removal profile. For example, if the expected removal profile closely approximates the target removal profile, then the actual removal profile, i.e., the amount actually removed from a substrate in polishing, should also closely approximate the target removal profile.

It should be noted that the removal profile described herein may be expressed as an amount of material removed from the substrate surface or, equivocally, as a material removal rate (e.g., by dividing removal profile by an actual or expected time spent polishing). Further, it should also be understood that the data used for the calculation could be stored in various different units, so long the data is converted into consistent units for the purpose of calculation.

In some implementations, the expected removal profile can be calculated as a linear function of the polishing parameters, e.g., the pressures provided by the chambers 146a-146c. For example, increasing the pressure in a particular chamber can result in a linear increase in the pressure of the substrate on the polishing pad, and thus a linear increase in the polishing rate, and thus a linear increase in the amount removed. In particular, for a plurality of different points on the substrate, e.g., points at different radial distances from the center of the substrate, the removal can be calculated as a linear combination of the polishing parameters, e.g., the pressures in the chambers.

A relationship between the polishing parameters and the removal profile can be determined based on measured data. For example, removal profiles can be measured for test substrates, which each test substrate being polished using a different set of values for the polishing parameters. In particular, one substrate can be polished under a set of baseline values for the polishing parameters, and a baseline removal profile is measured from the one substrate. Then, for each parameter that is to be set by the process, an additional substrate is polished, with that parameter set to an adjusted value that is different from the baseline value (but the other parameters set to their baseline values), and an adjusted removal profile is measured from the additional substrate.

In some implementations, the expected removal profile can be calculated as $$ERP = BRP + [K][P'] * BRP \quad (2)$$

where ERP is the expected removal profile, BRP is a baseline removal profile, [K] is a matrix of constants having a number of columns equal to the total number of parameters, N, and a number of rows equal to the total number M of radial positions on the substrate surface where the profile is measured, and [P'] is a vector of adjusted polishing system parameters. The total number of positions M can be greater than the number of chambers in the carrier head, and can be greater than the total number of controllable parameters N.

The baseline removal profile can be determined by polishing a test wafer at a set of default polishing parameters, $P0_1$, $P0_2$, ... $P0_N$, and comparing a measured (e.g., at a metrology station) surface profile after polishing to the initial surface profile. For example, the baseline removal profile can be calculated as $$BRP = ISP - BSP \qquad (3)$$

where BRP is the baseline removal profile, ISP is the initial surface profile, and BSP is the baseline surface profile achieved as a result of polishing a test substrate at baseline parameters $P0_1, P0_2, \ldots P0_N$.

The constants of the matrix [K] can be determined based on the baseline removal profile and the adjusted removal profiles. As noted above, the adjusted removal profiles can be generated by polishing an additional substrate for each parameter while modifying that parameter, one substrate at a time. For example, an adjusted removal profile can be calculated for each modified parameter according to the equation $$ARP_i = ISP - ASP_i \qquad (4)$$

where $ARP_i$ is the adjusted removal profile resulting from adjustment of the $i^{th}$ polishing parameter, ISP is the initial surface profile, and $ASP_i$ is the adjusted surface profile measured as a result of adjusting the $i^{th}$ parameter. In particular, the constant values of the matrix [K] can be calculated as $$K_{x,i} = \frac{ARP_{x,i} - BRP_x}{BRP_x * \left[\frac{PA_i - P0_i}{P0_i}\right]} \qquad (5)$$

where $K_{x,i}$ is the value of the matrix [K] corresponding to the substrate profile position x for the $i^{th}$ parameter, $ARP_{x,i}$ is the amount of material removed at radial position x for the $i^{th}$ adjusted parameter, $BRP_x$ is the amount of material removed at radial position x according to the previously calculated baseline removal profile, $PA_i$ is the $i^{th}$ parameter value used to generate the $i^{th}$ adjusted removal profile, and $P0_i$ is the $i^{th}$ parameter value for the baseline removal profile. As such, the matrix [K] can be expressed as $$[K] = \begin{bmatrix} K_{1,1} & \cdots & K_{1,N} \\ \vdots & \ddots & \vdots \\ K_{M,1} & \cdots & K_{M,N} \end{bmatrix} \qquad (6)$$

where M is the total number of radial substrate positions x at which profile measurements are taken and N is the total number of parameters. The variable expressions of the vector [P'], $P_1', P_2' \ldots P_N'$ are defined by $$P_i' = \frac{P_i - P0_i}{P0_i} \qquad (7)$$

where $P_i'$ is the value of the vector [P'] corresponding to the $i^{th}$ parameter, $P0_i$ is the $i^{th}$ parameter value for the baseline removal profile, and $P_i$ is the variable proposed parameter value. Thus, the expected removal profile can be expressed as $$ERP = BRP + \begin{bmatrix} K_{1,1} & \cdots & K_{1,N} \\ \vdots & \ddots & \vdots \\ K_{M,1} & \cdots & K_{M,N} \end{bmatrix} \begin{bmatrix} P_1' \\ \vdots \\ P_N' \end{bmatrix} * BRP \qquad (8)$$

where ERP is the expected removal profile, BRP is the baseline removal profile, and values for the matrix [K] and the vector [P'] are calculated as described above with reference to equations (5) and (7).

In some implementations, the various profiles generated from experimental measurement, e.g., the base removal profile and the adjusted removal profile, includes measured removal values for a plurality of positions under each zone, e.g., a plurality of positions under each chamber. Similarly, the calculated expected removal includes calculated values for the expected removal at plurality of positions under each zone, e.g., a plurality of positions under each chamber. In some implementations, the profiles, e.g., the base removal profile, the adjusted removal profile and expected removal profile, includes values for twenty to three hundred positions on the substrate. For example, the profiles can include values for positions on the substrate at a regular spacing of 1 mm.

In some implementations, a suitable combination of parameters can be determined by solving for respective parameters that minimize a difference between the expected removal profile and the target removal profile. That is, the value of ERP-TRP is minimized. In many cases, one or more distinct sets of parameters can be determined mathematically that provide an expected removal profile equaling the target removal profile, such that ERP-TRP=0. In other cases a difference value between the expected removal profile and the target removal profile can be minimized to an acceptable, non-zero value by using the following equation $$\Delta = \Sigma_{x=1}^{M}(ERP_x - TRP_x)^2 \qquad (9)$$

where $\Delta$ is a difference value, $ERP_x$ is the variable value of the expected removal profile at a radial position x on the substrate and $TRP_x$ is the constant value of the target removal profile at the radial position x. Values of $P_i$ can be calculated to find an expected removal profile that closely approximates the target removal profile.

In some examples, an iterative process (e.g., Newton's method of optimization) may be used in conjunction with equation (9) to determine an appropriate combination of parameter values to find a minimum difference between the estimated pressure profile and the target pressure profile, e.g., to find a minimum value for $\Delta$. For example, a commercially available solver function (e.g., the Microsoft Excel solver function, the MATLAB solver function, and/or the Wolfram Mathematica solver function, etc.) may be used to determine an appropriate combination of parameter values. In some cases, there may be several suitable combinations of parameter values.

Once an appropriate set of parameter values has been determined, as described above, the controller 190 can be configured to store the parameter values and execute a polishing technique accordingly to provide one or more substrates having the target surface profile.

In most cases, when all other parameter values are to be held constant, the polishing rate at a particular location on the substrate 10 can vary linearly with the pressure applied to the substrate, at that location of the substrate, on the polishing pad.

In another implementation, the controller 190 can be configured to store a target pressure profile. The controller 190 uses the target pressure profile to set the pressures in the chambers 146a-146c of the carrier head 140. The target pressure profile represents a desired pressure to be applied by the front surface of the substrate on the polishing pad. In some implementations, the target pressure profile can be considered the pressure distribution that should produce the polishing rates necessary to achieve the target surface profile. In some implementations, the target pressure profile can be determined, e.g., by the controller 190 or another computer system which forwards the target pressure profile to the controller 190, based on the initial surface profile of the substrate 10 (e.g., as measured at a metrology station prior to polishing or by an in-situ monitoring system) and the known linear relationship between polishing rate and polishing pressure. That is, the target pressure profile can be calculated as $$TPP = m*(ISP - TSP) \quad (10)$$

where TPP is the target pressure profile, ISP is the initial surface profile, TSP is the target surface profile, and m is an empirically determined constant. Alternatively, if the initial surface profile is unknown, then the initial surface profile can be set to a default value. Also, in some situations, the operator of the polishing system may desire to remove a target amount from the substrate rather than achieve a target profile. In this case, the target pressure profile is simply a linear function of the target amount to remove. In addition, in some situations, the operator of the polishing system may simply set the target polishing profile, e.g., based on a priori principals or previous experience. In this last case, the user can generate the target pressure profile by user input, e.g., to the controller 190 or to another computer system which forwards the target pressure profile to the controller 190.

The controller 190 can generate and store an expected pressure profile (that is, the pressure distribution across the front surface of substrate 10 on the polishing pad that is expected when chambers 146a-146c are pressurized). In some implementations, the target pressure profile can be approximated by a pressure profile expected to be applied by the chambers 146a-146c. Generally, it is advantageous to closely approximate the target pressure profile with the expected pressure profile. For example, closely approximating the target pressure profile with the expected pressure profile may result in an actual front surface profile of the substrate 10 that is a close approximation of the target surface profile after polishing.

In some implementations, the expected pressure applied by the substrate to the polishing pad can be calculated as a linear function of the pressure provided by the chambers 146a-146c. For example, increasing the pressure in a particular chamber can result in a linear increase in the pressure of the substrate on the polishing pad, and thus a linear increase in the polishing rate. In particular, for a plurality of different points on the substrate, e.g., points at different radial distances from the center of the substrate, the expected pressure can be calculated as a linear combination of the pressures in the chambers. For example, the estimated pressures can be calculated as $$EP_x = \Sigma_{i=1}^{N} A_{i,x} * P_i \quad (12)$$

where $EP_x$ is the estimated pressure applied at a location x, $P_i$ is the pressure in the $i^{th}$ chamber out of N chambers in the carrier head, and $A_{i,x}$ is a constant. As noted above, the location x can be a radial distance from the center of the substrate.

A relationship between the chamber pressures and the applied pressure, e.g., the values of the constants $A_{i,x}$, can be determined based on measured data. In some examples, a pressure sensor (e.g., a substantially planar sheet having an embedded one-dimensional or two-dimensional array of pressure sensors) can be inserted between the front surface of the substrate 10 and a rigid support or a polishing pad 110. At least one of the chambers 146a-146c is pressurized at a baseline pressure (e.g., between about 0-20 psi). Measurements provided by the measuring tool may reflect the downward pressure imparted on the substrate 10 at one or more positions (e.g., between about 1 and 100 positions) across its front surface, when the baseline chamber pressure is applied. In some implementations, measurements are recorded at positions regularly or irregularly spaced at radial distances from the center of the substrate 10. There will be more measurements than independently controllable chambers. In some implementations, the measurements are recorded at positions below specific chambers. For example, a first set of multiple measurements may be recorded below chamber 146a and a second set of multiple measurements may be recorded below chamber 146b.

In some implementations, chambers 146a-146c are pressurized one at a time to the baseline pressure while the other chambers are not pressurized. At this time measurements are recorded across the front surface of the substrate 10 (in some examples, the chambers are pressurized one at a time to different baseline pressures). The recorded pressure distributions based on each chamber may then be combined to provide an aggregate pressure distribution reflecting the pressure spill over across zones of the front substrate surface (see FIG. 4). In some implementations, the values of each constant $A_{i,x}$, can be calculated simply by dividing the measured downward pressure at the particular point (from the pressure distribution profile) by the baseline pressure that was applied to the chamber for the measurement.

Figure 5:
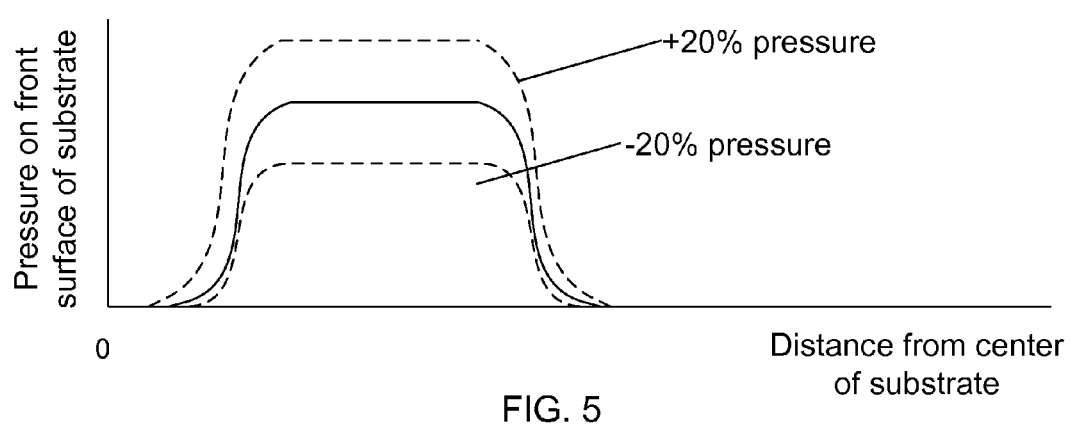
FIG. 5 shows a collection of measured pressure distributions resulting from pressurizing a carrier head chamber to various pressures while adjacent chambers are unpressurized.

In some examples, multiple pressure distributions for each chamber (recorded as described above) under various respective chamber pressures can be measured. Collectively, the multiple pressure distributions can be used in calculation of the estimated pressure profile. It may be advantageous to record multiple pressure distributions at various respective chamber pressures for each chamber in order to increase the approximation accuracy. FIG. 5 illustrates the pressure distributions measured across the front face of a substrate at varying chamber pressures. As shown, pressure distributions were measured under a baseline chamber pressure, as well as chamber pressures 20% above and below than the baseline.

When multiple pressure distributions for each chamber are provided, the estimated pressures can be calculated as $$EP_x = \Sigma_{i=1}^{N} A_{i,x} * P_i + B_{i,x} \quad (13)$$

where $EP_x$ where is the estimated pressure applied at a location x, $P_i$ is the pressure in the $i^{th}$ chamber out of N chambers in the carrier head, and $A_{i,x}$ is and $B_{i,x}$ are constants. Again, the location x can be a radial distance from the center of the substrate.

In some implementations, the values of constants $A_{i,x}$ and $B_{i,x}$ can be calculated by solving the following system of equations for each chamber i $$MP_{i,x,1} = A_{i,x} * P_{i,1} + B_{i,x} \quad (14)$$

$$MP_{i,x,2} = A_{i,x} * P_{i,2} + B_{i,x} \quad (15)$$

where $MP_{i,x,1}$ and $MP_{x,2}$ are the measured pressures at a radial location x on the substrate when the chamber i is pressurized at a first chamber pressure $P_1$ and second chamber pressure $P_2$ respectively.

Figure 6:
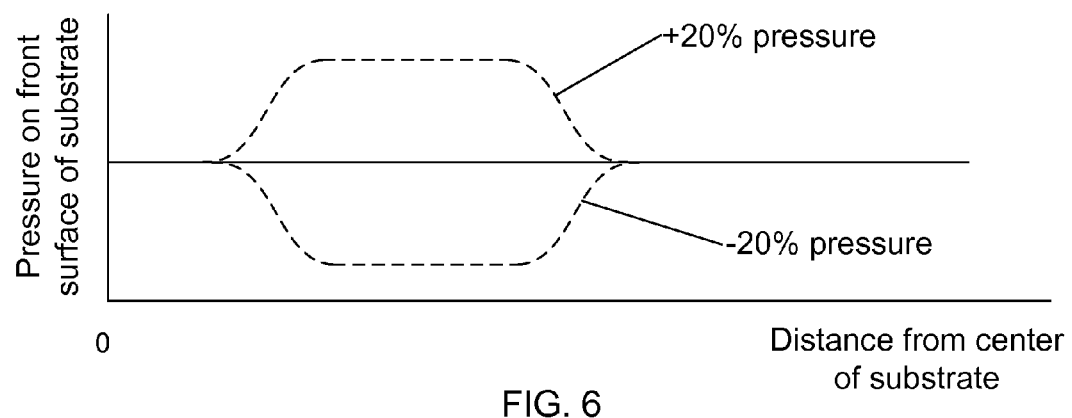
FIG. 6 shows a collection of measured pressure distributions resulting from pressurizing a carrier head chamber to various pressures while adjacent chambers are pressurized to a baseline pressure.

In some implementations, one or more pressure distributions for each chamber are measured while the other chambers are also pressurized. For example, FIG. 6 shows a collection of pressure distributions where chamber 146b is pressurized 20% above and below a baseline chamber pressure at which chambers 146a and 146c are pressurized. Although FIG. 6 illustrates a uniform pressure, e.g., from each chamber at the same pressure, the various chambers need not be at the same pressure (although the chambers should be pressurized), and the resulting pressure at the front surface of the need not be uniform. Without being limited by any particular theory, the degree to which the membrane material defining a respective chambers will expand or bulge (and thus the effect on pressure distribution) can depend on the pressure in the adjacent chamber. Thus, pressure distributions measured in this way can more accurately reflect the variations in pressure at the front surface of the substrate due to changes in chamber pressure, since in operation the chambers are typically at least partially pressurized.

For a given chamber, pressure distributions can be measured at one, two, or more than two chamber pressures (with more than two chamber pressures, the estimated pressure could be treated as a set of individual line segments, or a single linear function could be fit to the data). The number of chamber pressures at which pressure distributions are measured for a given chamber can be governed by a balance between available computing resources, accuracy requirements, and time for data collection.

In some implementations, one or more equations describing the expected pressure profile in terms of the variable individual pressure distributions for each chamber may be optimized by an iterative process (e.g., Newton's method of optimization) to closely approximate a target pressure profile. The first step of the iterative process may be to compare the pressure distribution profile measured at the baseline chamber pressure(s) to the target pressure profile. Then, based on the comparison, at least one variable of the equation (e.g., a pressure distribution based on one of the chambers) may be adjusted and an expected pressure profile may be calculated based on the adjusted variable. The expected pressure profile may then be compared to the target pressure profile, and another adjustment can be performed. The iterative adjustments and comparisons may continue until an expected pressure profile closely approximating the target pressure profile is determined (that is, until a threshold in the comparison value is reached).

In some examples the target pressure profile (TPP) can be described in terms of a plurality of target pressures at respective radial locations on the substrate surface. Similarly, the estimated pressure profile (EPP) can be described in terms of a plurality of expected pressures at respective radial locations on the substrate surface (i.e., $EP_x$—see equations (12) and (13) above). As shown above, the expected pressure at any location can be calculated as a function of chamber pressures. Thus, a combination of chamber pressures for providing a suitable approximation of the target pressure profile can be determined by solving for respective chamber pressures that minimize a difference between the estimated pressure profile and the target pressure profile. That is, the value of EPP-TPP is minimized.

For example, a difference value between the estimated pressure profile and the target pressure profile, e.g., using sum of squares or absolute values, and the values of the chamber pressures can be calculated to minimize this difference. For example, this can be performed by using one of the following equations $$\Delta = \Sigma_{x=1}^{M}([\Sigma_{i=1}^{N} A_{i,x} * P_i + B_{i,x}] - TP_x)^2 \quad (16)$$

$$\Delta = \Sigma_{x=1}^{M}([\Sigma_{i=1}^{N} A_{i,x} * P_i] - TP_x)^2 \quad (17)$$

where $\Delta$ is the difference value, $TP_x$ is the target pressure to be applied at the $x^{th}$ radial location out of M radial locations on the substrate, $P_i$ is a pressure in the $i^{th}$ chamber out of N chambers in the carrier head, and $A_{i,x}$ and $B_{i,x}$ are constants determined based on previously measured data. Values of $P_i$ can be calculated find a minimum for $\Delta$.

In some examples, an iterative process (e.g., Newton's method of optimization) may be used in conjunction with either of equations (16) or (17) to determine an appropriate combination of chamber pressures to find a minimum difference between the estimated pressure profile and the target pressure profile, e.g., to find a minimum value for $\Delta$. For example, a commercially available solver function may be used to determine an appropriate combination of chamber pressures. In some cases, there may be several suitable combinations of chamber pressures.

Once an acceptable expected pressure profile is determined, interpolation and/or extrapolation techniques (other known mathematical approximation techniques may also be used) can be applied to the measured baseline pressure distributions to determine a corresponding chamber pressure for each chamber. When using pressure distributions from a single baseline pressure it may be necessary to assume a zero scale pressure distribution (i.e., when the chambers are not pressurized, there is little or no polishing pressure applied).

Figure 7:
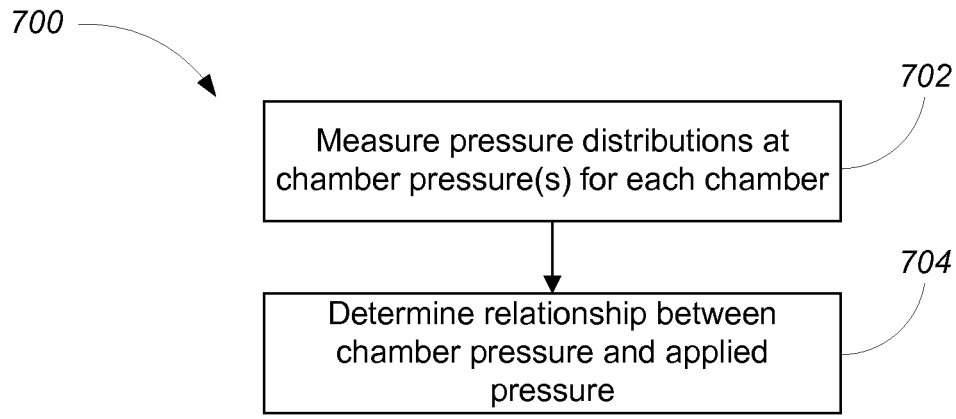
FIG. 7 is a flow chart of a method of generating a pressure distribution profile.
Figure 8:
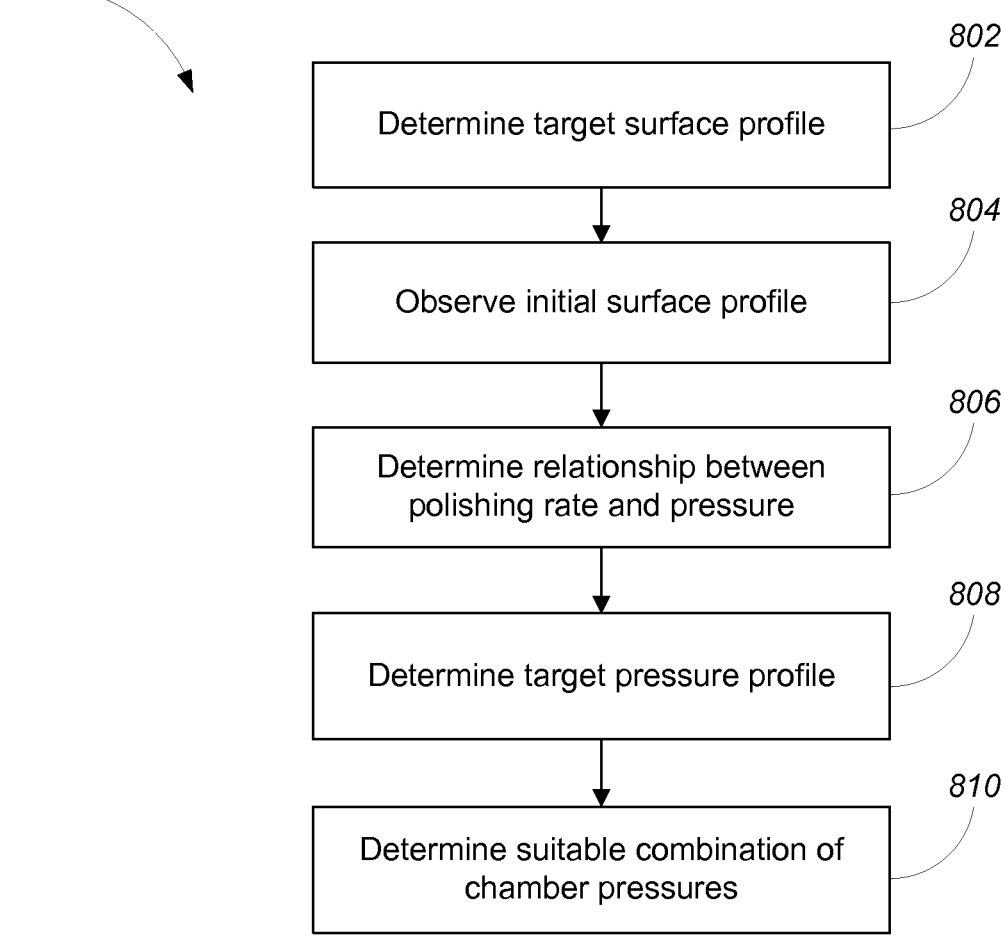
FIG. 8 is a flow chart of a method of selecting pressures for chambers in a carrier head.

Referring to FIGS. 7 and 8, example flow charts are illustrated. In some cases, the process steps shown in FIG. 7 may be performed by one or more employees of a manufacturer of the polishing apparatus 100. For example, one or more pressure distributions for each chamber may be measured and recorded by the manufacturer (step 702), as described above. The pressure distributions can be used to calculate (or otherwise determine) the relationships between chamber pressure and the downward pressure of the substrate on the polishing pad (step 704), as described above, e.g., by calculating constants $A_{i,x}$ and $B_{i,x}$. This information may be provided to a semiconductor fab by the manufacturer of the polishing apparatus 100.

In some cases, the process steps shown in FIG. 8 may be performed by one or more employees of a semiconductor fab. For example, an appropriate target surface profile for a substrate may be determined (step 802) by the semiconductor fab as part of a planarization technique for forming an integrated circuit. The initial surface profile of the substrate may be measured (step 804). For example, the surface profile of the substrate can be measured at a metrology station prior to polishing, or can be measured during polishing by an in-situ monitoring system. The relationship between polishing rate and downward pressure of the substrate on the polishing pad can be determined (step 806). In some cases, this information can be obtained from data provided by a supplier of the polishing apparatus or polishing pad. In some other cases, this relationship can be empirically determined by the semiconductor fab, e.g., by experimentally determining the constant m (see equation (10)). In some implementations, the target pressure profile can be determined (step 808) based on the initial surface profile, the target surface profile, and the relationship between polishing rate and pressure, as described above. A suitable combination of chamber pressures to achieve the target pressure profile, and thus the target surface profile, may then be determined (step 810) based on the known relationships between chamber pressure and the downward pressure on the substrate against the polishing pad across the substrate surface, as described above.

As used in the instant specification, the term substrate can include, for example, a product substrate (e.g., which includes multiple memory or processor dies), a test substrate, a bare substrate, and a gating substrate. The substrate can be at various stages of integrated circuit fabrication, e.g., the substrate can be a bare wafer, or it can include one or more deposited and/or patterned layers. The term substrate can include circular disks and rectangular sheets.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable non-transitory storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier head, or both can move to provide relative motion between the polishing surface and the substrate. For example, the platen may orbit rather than rotate. The polishing pad can be a circular (or some other shape) pad secured to the platen. Some aspects of the endpoint detection system may be applicable to linear polishing systems, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used; it should be understood that the polishing surface and substrate can be held in a vertical orientation or some other orientation during operation.

Particular embodiments of the invention have been described. Other embodiments are within the scope of the following claims. For example, the actions recited in the claims can be performed in a different order and still achieve desirable results.

What is claimed is:

1. A method of selecting values for a plurality of independently controllable chamber pressures of a carrier head in a chemical mechanical polishing system, the carrier head including a plurality of chambers to apply the independently controllable chamber pressures to a plurality of corresponding zones on a substrate, comprising:

for each chamber and corresponding zone, storing data relating variation in removal profile on a front surface of the substrate to variation in the controllable chamber pressure of the chamber, the data including removal at a plurality of positions on the front surface of the substrate, there being a greater number of positions than chambers, the plurality of positions including positions inside the corresponding zone and positions outside the corresponding zone;

determining a value of a chamber pressure for each chamber of the plurality of controllable chambers to minimize a difference between a target removal profile and an expected removal profile calculated from the data relating variation in removal profile on a front surface of the substrate to variation in the chamber pressure for each chamber such that an expected removal rate for at least some positions within a zone from the plurality of zones includes an effect of the chamber pressure for the chamber corresponding to the zone and an effect of the chamber pressure for a chamber that does not correspond to the zone; and storing the value for each chamber pressure of the plurality of controllable chamber pressures.

2. The method of claim 1, wherein the plurality of zones are arranged concentrically and the plurality of positions are radial distances from the center of the substrate.

3. The method of claim 2, wherein the plurality of positions include a first plurality of positions below a first zone of the plurality of zones and a second plurality of positions below a second zone of the plurality of zones.

4. The method of claim 1, wherein the positions are regularly spaced across the substrate.

5. The method of claim 1, wherein storing data comprises storing a plurality of measured removal profiles, each measured removal profile including an amount removed from a front surface of a substrate at each of a plurality of positions on the substrate.

6. The method of claim 5, wherein the plurality of removal profiles includes a baseline removal profile for one substrate polished under a set of baseline values for the plurality of controllable chamber pressures.

7. The method of claim 6, wherein the plurality of removal profiles includes a plurality of adjusted removal profiles for additional substrates, each additional substrate is polished with exactly one of the plurality of controllable chambers set to an adjusted value for the chamber pressure that is different from the baseline value for the one substrate.

8. The method of claim 7, wherein the one of the plurality of controllable chambers is different for each additional substrate.

9. The method of claim 1, wherein determining a value for each chamber pressure comprises iteratively adjusting at least one value, calculating the expected removal profile from the data, and determining a difference between an expected pressure profile and a target pressure profile.

10. The method of claim 9, wherein determining the value for the chamber pressure for each chamber using Newton's method of optimization.

11. The method of claim 1, further comprising generating the target removal profile from data collected in-situ during polishing of a first substrate, and adjusting a pressure in a chamber during the polishing of the first substrate to match the value for the chamber pressure for the chamber.

12. The method of claim 1, further comprising generating the target removal profile from data collected in-situ during polishing of a first substrate at a first platen, and polishing the first substrate at a different second platen using the chamber pressure for the chamber set to the value.

13. The method of claim 1, further comprising generating the target removal profile from data collected in-situ during polishing of a first substrate at a first platen, and polishing a different second substrate at the first platen using the chamber pressure for the chamber set to the value.

14. A method of selecting values for a plurality of controllable parameters of a chemical mechanical polishing system that includes a carrier head with a plurality of zones to apply independently controllable pressures on a substrate, comprising:

storing data relating variation in removal profile on a front surface of the substrate to variation in the controllable parameters, the data including removal at a plurality of positions on the front surface of the substrate, there being a greater number of positions than chambers; wherein the storing data further comprises storing a plurality of removal profiles, each removal profile including an amount removed from a front surface of a substrate at each of a plurality of positions on the substrate, and wherein the plurality of removal profiles includes a baseline removal profile for one substrate polished under a set of baseline values for the plurality of controllable parameters;

determining a value for each parameter of the plurality of controllable parameters to minimize a difference between a target removal profile and an expected removal profile calculated from the data relating variation in removal profile on a front surface of the substrate to variation in the controllable; and storing the value for each parameter of the plurality of controllable parameters;

wherein calculating the expected removal profile comprises calculating

ERP=BRP+[K][P']*BRP where ERP is the expected removal profile, BRP is the baseline removal profile, [K] is a matrix of constants having a number of columns equal to the total number of parameters, N, and a number of rows equal to the total number of radial positions on the substrate surface where the profile is measured, M, and [P'] is a column matrix of adjusted polishing system parameters.

15. The method of claim 14, wherein the plurality of controllable parameters include pressures for a plurality of chambers in the carrier head that apply pressure to the plurality of zones.

16. The method of claim 15, wherein the plurality of controllable parameters include a pressure for a chamber in the carrier head that applies pressure to a retaining ring of the carrier head.

17. The method of claim 14, wherein the wherein the plurality of controllable parameters include a platen rotation rate or a carrier head rotation rate.

18. The method of claim 14, wherein there are a greater number of positions than parameters.

19. The method of claim 14 wherein each parameter $P_i'$ of the column of adjusted polishing system parameters [P'] comprises $$P_i' = \frac{P_i - P0_i}{P0_i}$$

where $P_i$ is the value of the polishing parameter to be calculated, and $P0_i$ is the baseline value for the polishing parameter.

20. The method of claim 19, wherein the matrix [K] can be expressed as $$[K] = \begin{bmatrix} K_{1,1} & \cdots & K_{1,N} \\ \vdots & \ddots & \vdots \\ K_{M,1} & \cdots & K_{M,N} \end{bmatrix} \quad (6)$$

where M is the total number of radial substrate positions x at which profile measurements are taken and N is the total number of parameters.

21. The method of claim 20, wherein constants of the matrix comprise $$K_{x,i} = \frac{ARP_{x,i} - BRP_x}{BRP_x * \left[\frac{PA_i - P0_i}{P0_i}\right]} \quad (5)$$

where $K_{x,i}$ is the value of the matrix [K] corresponding to the substrate profile position x for the $i^{th}$ parameter, $ARP_{x,i}$ is the amount of material removed at radial position x for the $i^{th}$ adjusted parameter, $BRP_x$ is the amount of material removed at radial position x according to the previously calculated baseline removal profile, $PA_i$ is the $i^{th}$ parameter value used to generate the $i^{th}$ adjusted removal profile, and $P0_i$ is the $i^{th}$ parameter value for the baseline removal profile.

* * * * *

UNITED STATES PATENT AND TRADEMARK OFFICE
CERTIFICATE OF CORRECTION

PATENT NO.         : 8,774,958 B2                                   Page 1 of 1
APPLICATION NO.    : 13/098257
DATED              : July 8, 2014
INVENTOR(S)        : Huanbo Zhang et al.

It is certified that error appears in the above-identified patent and that said Letters Patent is hereby corrected as shown below:

In the Claims

Claim 10, column 16, line 53, after "chamber" insert -- comprises --.

Claim 14, column 17, line 26, delete "controllable;" and insert -- controllable parameters; --.

Claim 17, column 18, lines 1-2, before "plurality" delete "wherein the".

Signed and Sealed this
Seventh Day of October, 2014

Michelle K. Lee
*Deputy Director of the United States Patent and Trademark Office*